July 22, 1924.

E. L. HILL

CHAIN FASTENER

Filed June 14, 1923

Inventor
Elmer L. Hill

Watson E Coleman
Atty

Patented July 22, 1924.

1,502,386

UNITED STATES PATENT OFFICE.

ELMER L. HILL, OF RAPELJE, MONTANA.

CHAIN FASTENER.

Application filed June 14, 1923. Serial No. 645,400.

*To all whom it may concern:*

Be it known that I, ELMER L. HILL, a citizen of the United States, residing at Rapelje, in the county of Stillwater and State of Montana, have invented certain new and useful Improvements in Chain Fasteners, of which the following is a specification, reference being had to the accompanying drawings.

This invention relates to certain improvements in chain fasteners and it is an object of the invention to provide a novel and improved device of this general character wherein chain extremities may be effectively tied or connected and in a manner whereby the liability of accidental separation is substantially eliminated.

It is also an object of the invention to provide a novel and improved device of this general character comprising a body member and a lever engaged therewith, said lever being operatively engaged with the chain extremity and the body member being provided with means to engage a second chain extremity whereby said chain extremities are effectively tied or connected, the lever when in closed position serving to prevent the second chain extremity from becoming disengaged from the body member.

Another object of the invention is to provide a novel and improved fastener of this general character which is particularly adapted for use in connection with a side chain of an anti-skidding device although it is to be understood that the fastener can be employed in connection with chains used for other purposes.

The invention consists in the details of construction and in the combination and arrangement of the several parts of my improved chain fastener whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
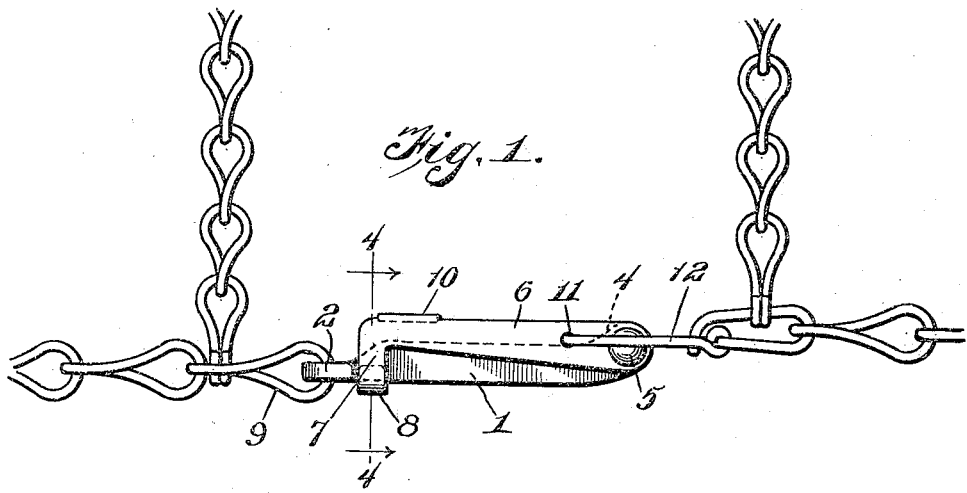
Figure 1 is an elevational view illustrating a chain fastener constructed in accordance with an embodiment of my invention and in applied position.
Figure 2:
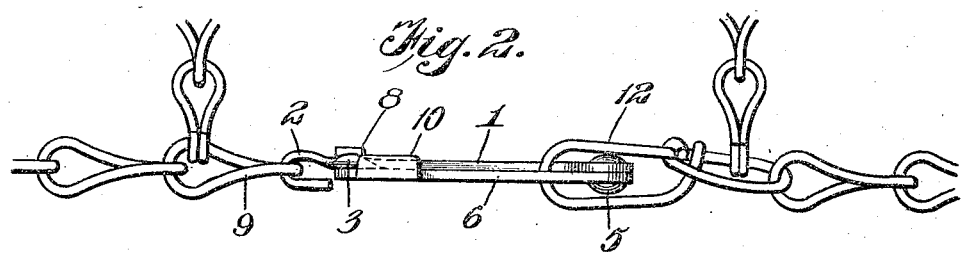
Figure 2 is a view in top plan of the structure as illustrated in Figure 1.
Figure 3:
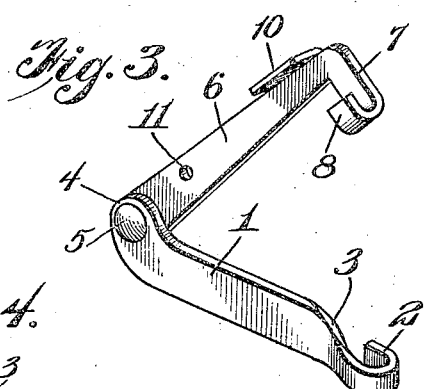
Figure 3 is a view in perspective of my improved fastener as herein disclosed unapplied with the lever in open position.
Figure 4:
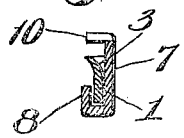
Figure 4 is a sectional view taken substantially on the line 4—4 of Figure 1.

As disclosed in the accompanying drawings, 1 denotes an elongated flat body member or bar having one end portion returned to provide an inwardly facing hook member 2. The marginal portion of the member or bar 1 immediately adjacent to the hook member 2 is provided with an outwardly directed lip 3 disposed in a direction away from the hook member 2 and affording a beveled or cam surface for a purpose to be hereinafter more particularly referred to.

The end portion of the member or bar 1 remote from the hook member 2 is laterally extended as at 4 and with which portion 4 is pivotally connected as at 5 an end portion of an elongated flat lever 6. The outer or free end portion of the lever 6 is provided with a laterally disposed arm 7 which, when the lever 6 is in open position is disposed toward the body member or bar 1. The arm 7 terminates in an inwardly facing hook member 8.

The lever 6 is of such length so that when said lever is in substantially overlying relation with respect to the body member or bar 1 the arm 7 closely approaches the hook member 2 and substantially closes the inner or open portion of said hook member 2 whereby a link 9 or other member engaged by the hook member 2 is positively held against displacement.

When the lever 6 is moved into closed position the hook member 8 comes into contact with the lip 3 and passes over the beveled or cam face thereof whereby the free end portion of the lever 6 is caused to move laterally with respect to the member or bar 1 so that the hook member 8 may readily pass thereacross. When the hook member 8 passes beyond the member or bar 1 the inherent resiliency possessed by the lever 6 causes said lever to return into close contact with the body member or bar 1 with the hook member 8 bridging or straddling the adjacent marginal portion of the member or bar 1 whereby the lever 6 is effectively held by the hook member 8 against undue swinging movement with respect to the body member or bar 1.

In order to facilitate the operation of the lever 6 the same is provided adjacent its outer or free end with the laterally disposed lip or flange 10 affording what may be termed a thumb piece whereby the requisite pressure may be imposed upon the lever 6 to adjust the same into closed position with respect to the member or bar 1.

As herein disclosed my improved fastener is especially designed for use in connection with an anti-skid chain of a conventional type and a lever 6 at a predetermined point intermediate its ends is provided with an opening 11 through which is disposed a clevis 12 or the like which is suitably secured to an extremity of a side chain. In applying the anti-skid chain to a tire, the second extremity of the side chain is engaged with the hook member 2 and as the lever 6 is swung toward the member or bar 1 for locking engagement therewith, said lever also serves to take up slack which may be in the side chain. By having the member or bar 1 and the lever 6 flat, the fastener can lie close to the wheel structure to which the anti-skid chain is applied and it is to be particularly noted that the lever 6 will have swinging movement in a direction radially of the wheel structure. It is also to be noted that my improved fastener will operate with equal facility with the parts arranged in reversed relation than that illustrated in the accompanying drawing. Due to this fact when one side of the tread chain becomes unduly worn, the anti-skid device can be applied in reversed arrangement. By this means the life of the anti-skidding device will be materially prolonged.

From the foregoing description it is thought to be obvious that a chain fastener constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A fastener of the class described comprising an elongated member provided with an inwardly facing hook at one end, a lever pivotally engaged with the opposite end to engage one of the members to be connected to the member and of a length to closely approach the hook when the lever is in substantially overlying relation with respect to the member, the second member being substantially permanently connected direct with the lever at a point outwardly of the pivotal connection between the lever and member, the outer end portion of the lever being provided with a laterally disposed arm terminating in an inwardly facing hook, said hook of the arm straddling or bridging a marginal portion of the member when the lever and member are substantially in overlying relation, the opposite marginal portion of the member being provided with a cam surface with which the hook member of the arm engages to permit said hook of the arm to pass over the member.

2. A fastener of the class described comprising an elongated member provided with an inwardly facing hook at one end, a lever pivotally engaged with the opposite end to engage one of the members to be connected to the member and of a length to closely approach the hook when the lever is in substantially overlying relation with respect to the member, the second member being substantially permanently connected direct with the lever at a point outwardly of the pivotal connection between the lever and member, the outer end portion of the lever being provided with a laterally disposed arm terminating in an inwardly facing hook, said hook of the arm straddling or bridging a marginal portion of the member when the lever and member are substantially in overlying relation, the opposite marginal portion of the member being provided with a cam surface with which the hook member of the arm engages to permit said hook of the arm to pass over the member, said member and lever being substantially flat.

3. A fastener of the class described comprising an elongated member provided with an inwardly facing hook at one end, a lever pivotally engaged with the opposite end to engage one of the members to be connected to the member and of a length to closely approach the hook when the lever is in substantially overlying relation with respect to the member, the second member being substantially permanently connected direct with the lever at a point outwardly of the pivotal connection between the lever and member, the outer end portion of the lever being provided with a laterally disposed arm terminating in an inwardly facing hook, said hook of the arm straddling or bridging a marginal portion of the member when the lever and member are substantially in overlying relation, the opposite marginal portion of the member being provided with a cam surface with which the hook member of the arm engages to permit said hook of the arm to pass over the member, and a member secured to the lever.

In testimony whereof I hereunto affix my signature.

ELMER L. HILL.